United States Patent
Ronga et al.

(10) Patent No.: US 11,002,470 B2
(45) Date of Patent: May 11, 2021

(54) INJECTION DEVICES FOR INJECTING ADDITIVES

(71) Applicant: ERRECOM S.R.L., Corzano (IT)

(72) Inventors: Luca Ronga, Corzano (IT); Nicola Ronga, Corzano (IT)

( * ) Notice: Subject to any disclaimer, the term of this patent is extended or adjusted under 35 U.S.C. 154(b) by 69 days.

(21) Appl. No.: 16/300,098

(22) PCT Filed: May 10, 2017

(86) PCT No.: PCT/IB2017/052715
§ 371 (c)(1),
(2) Date: Nov. 9, 2018

(87) PCT Pub. No.: WO2017/195122
PCT Pub. Date: Nov. 16, 2017

(65) Prior Publication Data
US 2019/0390883 A1 Dec. 26, 2019

(30) Foreign Application Priority Data
May 10, 2016 (IT) .......................... 102016000047751

(51) Int. Cl.
*F25B 45/00* (2006.01)
*F25B 49/00* (2006.01)

(52) U.S. Cl.
CPC ............ *F25B 45/00* (2013.01); *F25B 49/005* (2013.01); *F17C 2205/0382* (2013.01); *F17C 2205/0394* (2013.01); *F25B 2345/001* (2013.01); *F25B 2500/222* (2013.01)

(58) Field of Classification Search
CPC ........ F25B 45/00; F25B 2500/22; G01M 3/20
See application file for complete search history.

(56) References Cited

U.S. PATENT DOCUMENTS 6,164,348 A 12/2000 Rodwell et al.
6,196,016 B1 * 3/2001 Knowles ............ B60H 1/00585
222/135

(Continued)

FOREIGN PATENT DOCUMENTS

EP 2918987 A1 9/2015

OTHER PUBLICATIONS

Definition of Obturator, retrieved on Oct. 7, 2020 from https://www.ksb.eom/centrifugal-pump-lexicon/obturator/191786/#:~:text=Obturators%20or%20closing%20elements%20are,control%20valve%20discs%20or%20plugs. (Year: 2020).*

*Primary Examiner* — Cassey D Bauer
(74) *Attorney, Agent, or Firm* — Themis Law (57) ABSTRACT

Injection devices are provided for injecting additives into a refrigeration or air conditioning systems, which include a tubular element defining an inner chamber, the inner chamber having a volume at least equal to the volume of the quantity of additive to be injected. An inlet fitting is attached to a first end of the tubular element; an outlet fitting is attached to a second end of the tubular element. The devices are also provided with an additive inlet port, distinct from the inlet and outlet ducts, fluidically communicating with the inner chamber and configured for removable connection to an additive injection device. The inlet port is engaged by a one-way valve suitable for allowing the passage of the additive only from the injection device to the inner chamber. Kits and methods are also provided.

11 Claims, 6 Drawing Sheets

(56) References Cited

U.S. PATENT DOCUMENTS

| | | | | |
|---|---|---|---|---|
| 6,880,587 B1 * | 4/2005 | Carter | ................ | B60H 1/00585 |
| | | | | 141/383 |
| 7,077,149 B2 * | 7/2006 | Kalley | .................... | F16L 29/02 |
| | | | | 137/1 |
| 2003/0005738 A1 * | 1/2003 | Juedes | ................... | B21D 15/10 |
| | | | | 72/61 |

* cited by examiner

INJECTION DEVICES FOR INJECTING ADDITIVES

CROSS-REFERENCE TO RELATED APPLICATIONS

This application is a National Phase Application of PCT International Application No. PCT/IB2017/052715, International Filing Date, May 10, 2017, claiming priority to Italian Patent Application No. 102016000047751, filed May 10, 2016, each of which is hereby incorporated by reference in its entirety.

FIELD OF THE INVENTION

The present invention relates in general to the field of pressurised fluid systems and refers more specifically to a device and a method for injecting a quantity of an additive into a pressurised refrigeration or air conditioning system, for example to detect and repair leaks.

The additive may be one or a combination of a fluorescent tracer, a lubricant, a leak stopper, a performance enhancer, a dehumidifier additive, an antifreeze, an acid neutralizer additive, a refrigerant leak detector.

BACKGROUND OF THE INVENTION

Devices for injecting a predetermined quantity of a fluorescent tracer and/or a lubricant into a pressurised system are already known of.

For example, these devices usually comprise a cartridge containing the additive to be injected into the system and having an outlet nozzle and a plunger inserted slidingly into the cartridge and suitable to make the additive come out of the cartridge.

In some embodiments, known for example from U.S. Pat. No. 6,164,348, the outlet nozzle of the cartridge is connected to the end of a hose. The other end of the hose is suitable to be connected to a service valve of the pressurised refrigeration or air conditioning system.

In other embodiments, known for example from EP2918987A1, the outlet nozzle of the cartridge can be directly connected to the service valve of the pressurised refrigeration or air conditioning system.

In any case, to inject the additive into the pressurised circuit of the refrigeration or air conditioning system a certain force must be exerted on the plunger of the cartridge so as to overcome the pressure present in the circuit. To facilitate this operation plunger actuation devices have been proposed, of the pistol type, which are however still manually operated.

To obviate the need to exert a manual force to inject the additive by overcoming the pressure present in the pressurised circuit, an injection device consisting of a tube already filled by the supplier of the additive with a predetermined quantity of additive has also been proposed. The tube is fitted at one end with a connection fitting to the refrigeration or air conditioning system and at the other end with a connection fitting to a supply pipe of the gas used by the refrigeration or air conditioning system, coming from a tank, such as a cylinder.

This way, when the injection device is connected to the supply pipe and the service valve of the system, and the delivery of gas from the tank is enabled, it is the pressure of the gas in the tank, higher than the gas in the system, which pushes the additive into the circuit of the system. No manual action by the user is therefore required, except that of connecting the injection device to the dispensing tube and to the system.

Such embodiment of the injection device has however the disadvantage of supplying a pre-determined quantity of additive. In some situations, such amount of additive may be insufficient or excessive. In any case, once the additive has been dispensed, the injection device is no longer usable and must therefore be disposed of. To make further injections of additive new injection devices are therefore necessary.

SUMMARY OF THE INVENTION

The purpose of the present invention is to provide an injection device and a method which overcomes the aforesaid drawbacks with reference to the devices of the prior art.

Such purpose is achieved by injection devices for injecting additives into a refrigeration or air-conditioning system, injection kits and injection methods as described and claimed herein.

Characteristics and advantages of injection devices according to the invention will, in any case, be evident from the following description of its preferred embodiments, provided by way of non-limiting examples, with reference to the attached drawings.

DETAILED DESCRIPTION

Figure 1:
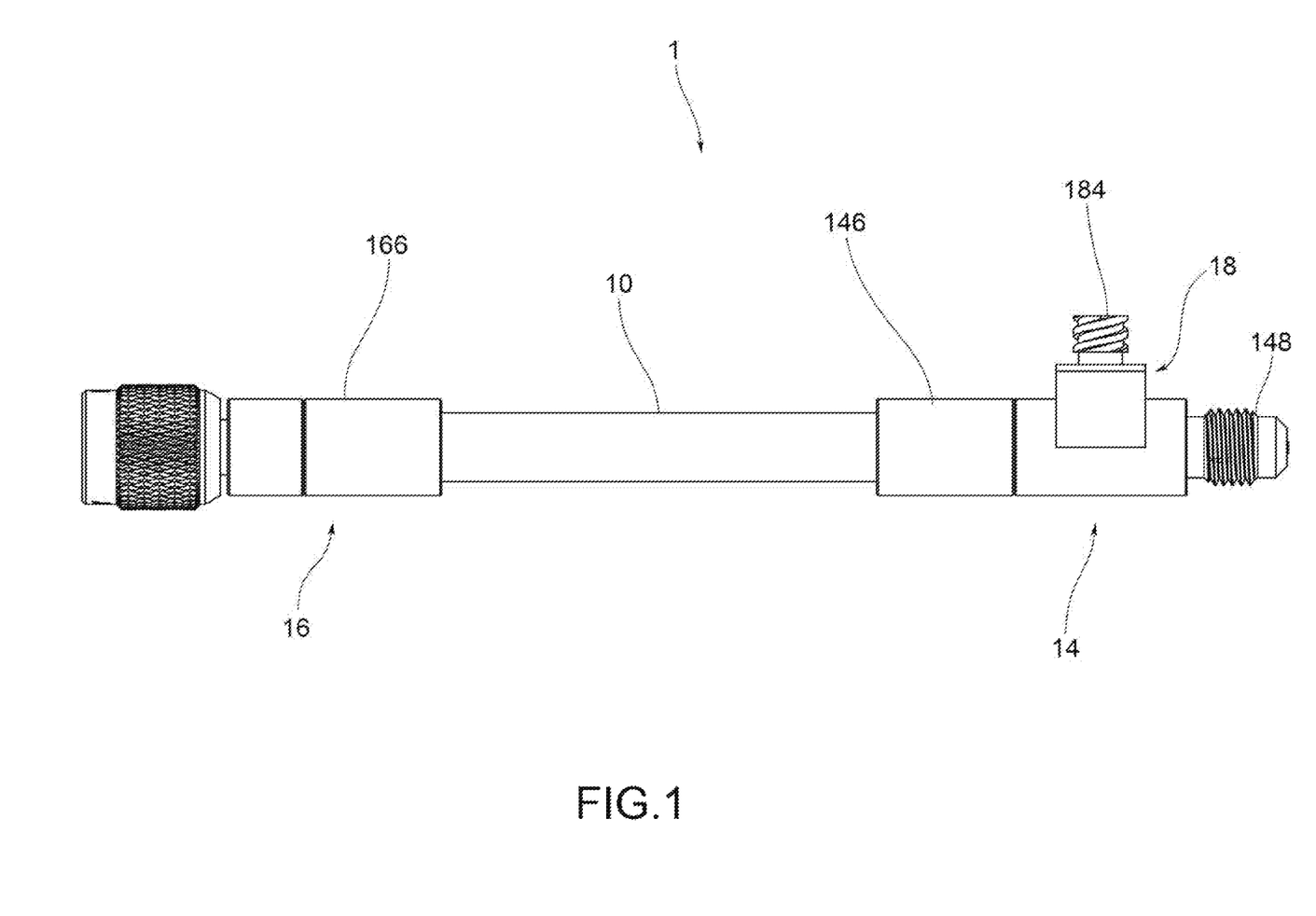
FIG. 1 is a side view of the injection device according to the invention.
Figures 2, 3:
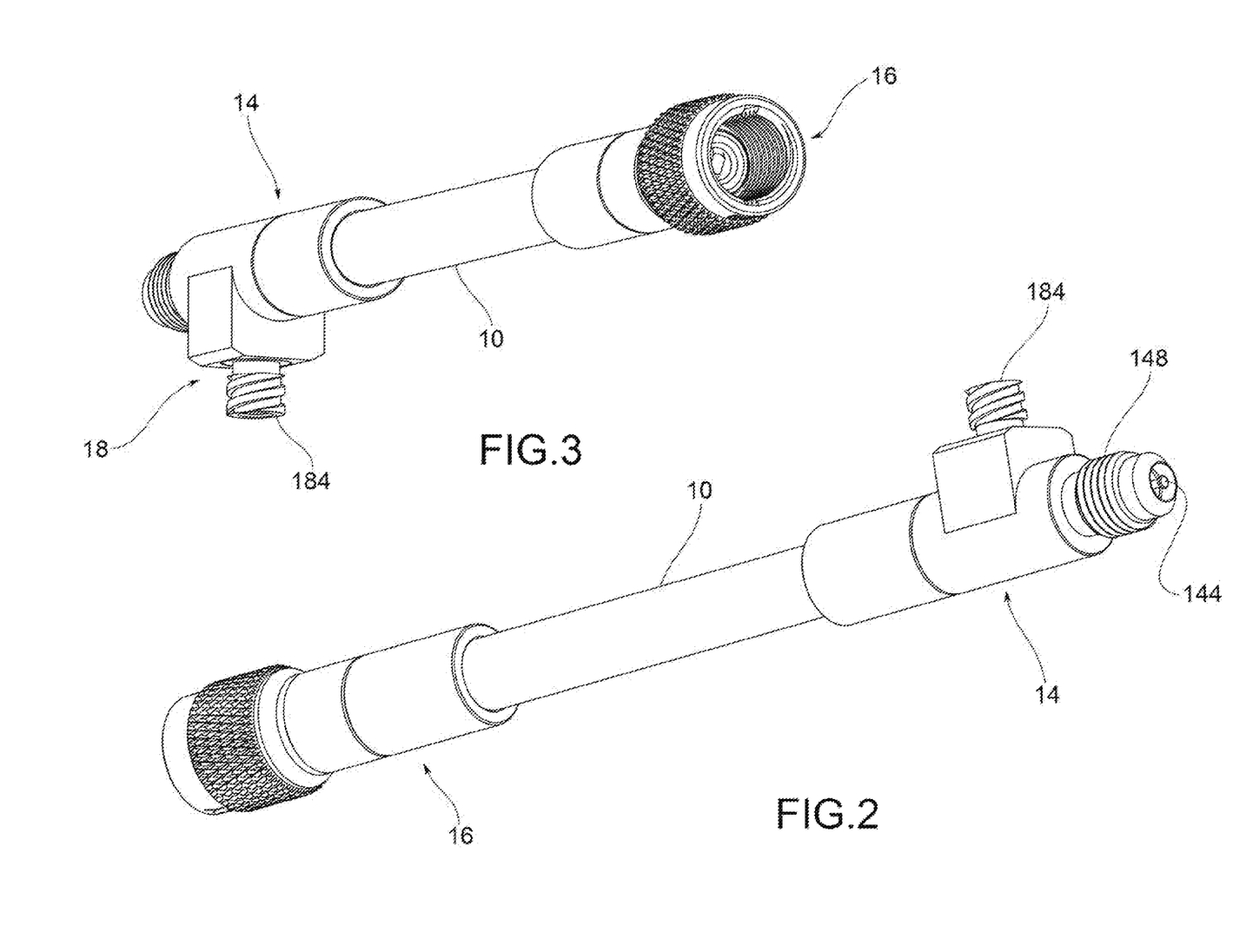
FIG. 2 is a perspective view of the injection device.
FIG. 3 is another perspective view of the injection device.
Figure 4:
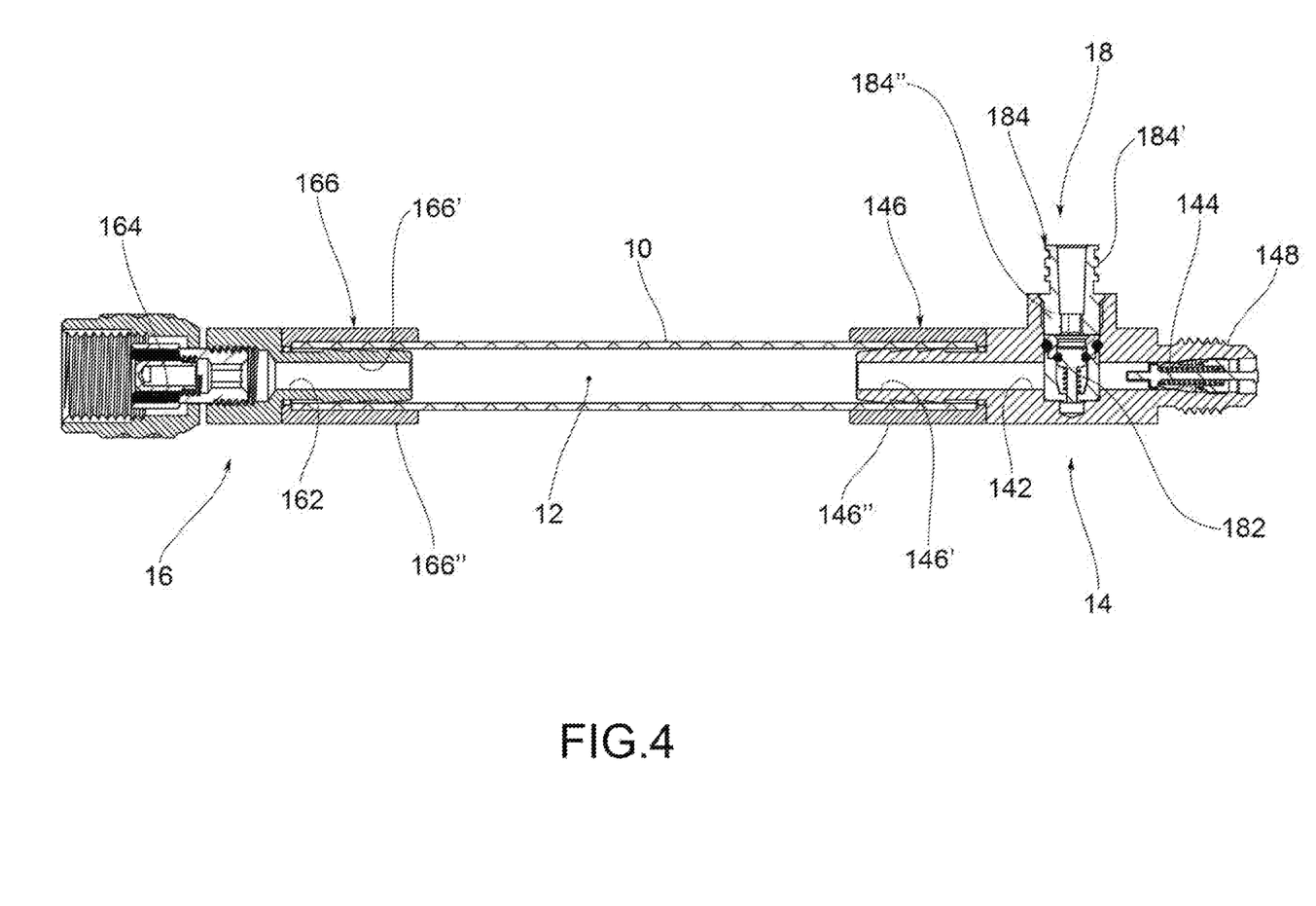
FIG. 4 is an axial cross-section of the injection device.
Figure 5:
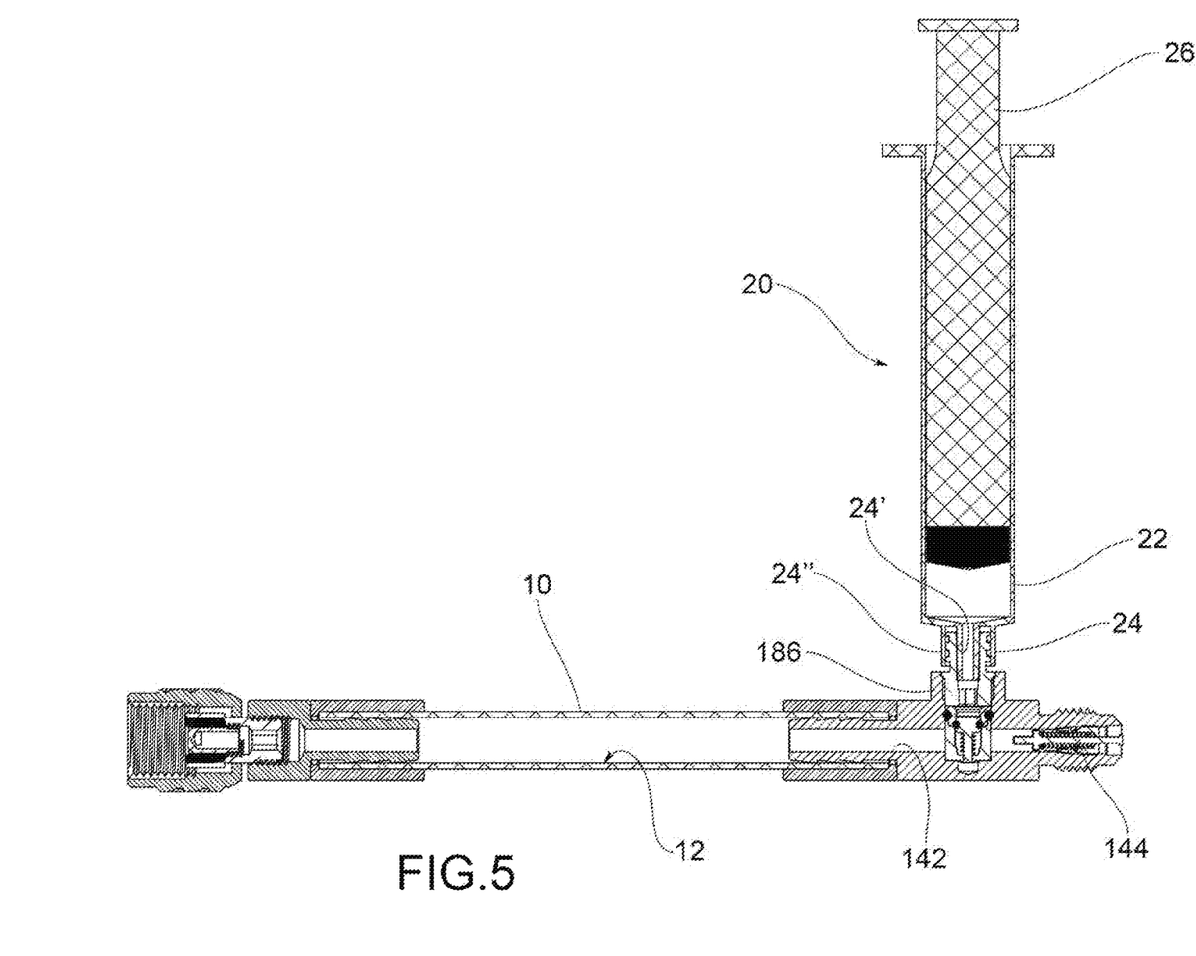
FIG. 5 is an axial cross-section of the injection device to which a cartridge containing the additive to be injected is connected.
Figure 6:
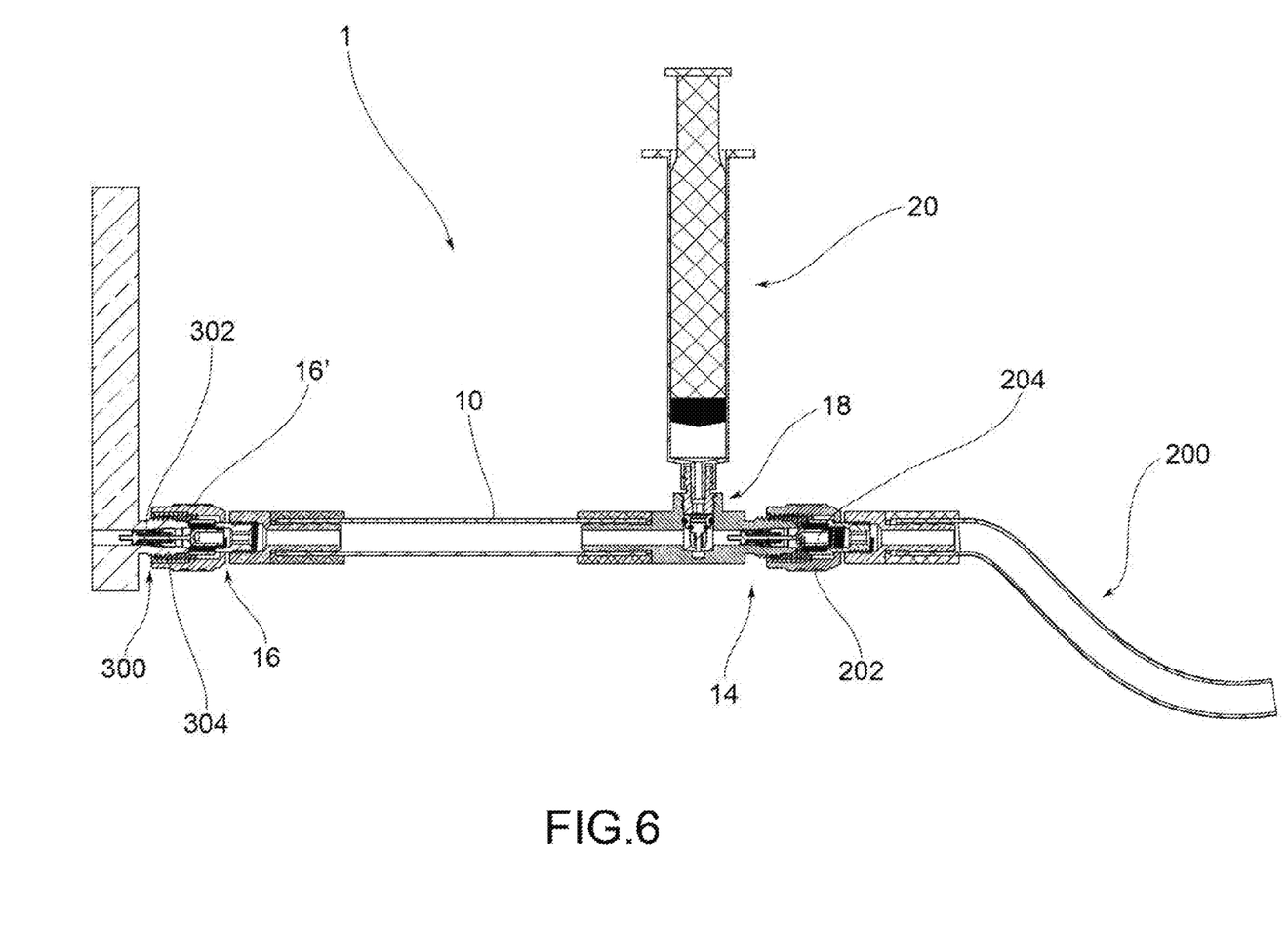
FIG. 6 is a view of the device connected to a service valve of a refrigeration or air conditioning system and to a refrigeration or air conditioning gas supply hose.
Figure 7:
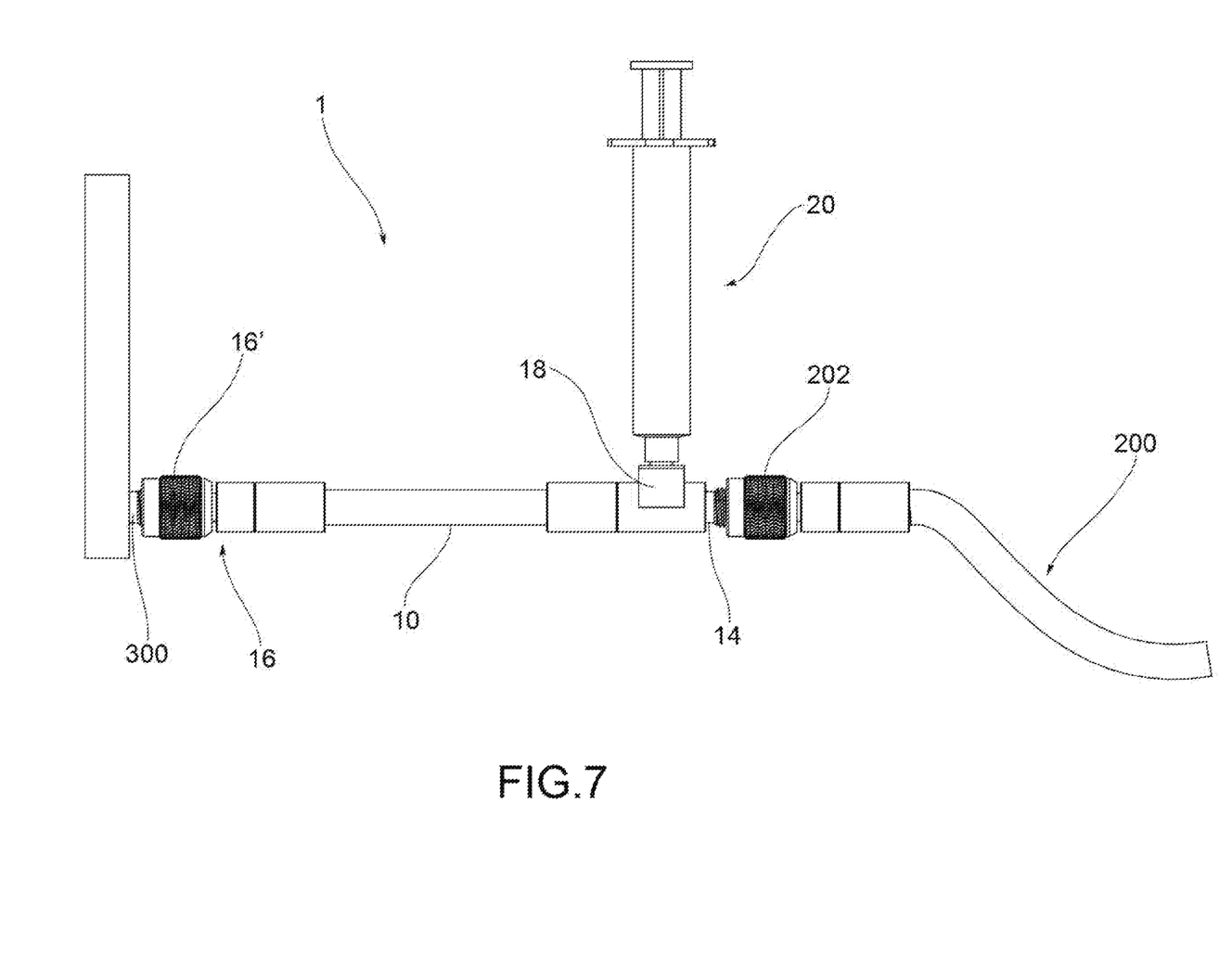
FIG. 7 is a cross-section view of the device connected to the service valve and the supply hose in FIG. 6.

In said drawings, reference numeral 1 globally denotes an injection device of an additive in a refrigeration or air conditioning system, according to the invention.

The injection device 1 comprises a tubular element defining an inner chamber 12 suitable to receive a desired quantity of additive to be injected.

In one embodiment, the tubular element 10 is a tube made of a polymer material, preferably a hose.

Moreover, in one embodiment, the tubular element 10 is made of at least partly transparent material, so as to allow a user to visually check the flow of the additive inside the tubular element, as will be described below.

An inlet fitting 14 is fixed to a first end of the tubular element 10.

An outlet fitting 16 is fixed to a second end of the tubular element 10.

The inlet fitting 14 defines an inlet duct 142 suitable to place the inner chamber 12 in fluidic communication with a dispensing duct 200 of a gas, in particular a refrigerant gas to be used in the refrigeration or air conditioning system. The dispensing duct 200 is suitable to dispense the refrigerant gas at a higher supply pressure than the pressure of the refrigerant gas, if already present, into the circuit of the refrigeration or air conditioning system.

For example, the dispensing duct 200 is fluidly connected to a gas tank or cylinder. For example, the dispensing duct 200 is a tube normally used to connect the gas tank or cylinder or manometer unit to a service valve of the refrigeration or air conditioning system.

The inlet duct 142 is engaged by an inlet obturator member 144 movable between a closed position of the inlet duct 142 when the inlet fitting 14 is disconnected from the dispensing duct 200 and an open position of the inlet duct 142 when the inlet fitting 14 is connected to the dispensing duct 200.

The outlet fitting 16 defines an outlet duct 162 suitable to be connected to a service valve 300 of the refrigeration or air conditioning system.

In one embodiment, the outlet duct 16 is engaged by an obturator member 164, for example of a type suitable to allow the passage of a fluid only in output from the inner chamber 12.

For example the obturator member 164 is movable between a closed position of the outlet duct 162 when the outlet fitting 16 is disconnected from the service valve 300 and an open position of the outlet duct 162 when the outlet fitting 16 is connected to the service valve 300.

The injection device further comprises an additive inlet port 18 distinct from the inlet 14 and outlet 16 ducts.

This additive inlet port 18 communicates fluidically with the inner chamber 12 and is configured for a removable connection to an additive injection device.

In one embodiment, the additive inlet port 18 is engaged by a one-way valve 182 suitable to allow the passage of the additive only from the injection device to the inner chamber 12.

According to one embodiment, the additive inlet port 18 is made in one of the input 14 or output fittings 16.

In one embodiment, the additive inlet port 18 is made in an intermediate portion of the inlet fitting 14, between a proximal portion 146 connected to the end of the tubular element and a distal portion 148 connected to the dispensing duct.

In one embodiment, the additive inlet port 18 comes out in the inner chamber 12, perpendicular to the main axis of the tubular element 10.

In one embodiment, the additive inlet port 18 is suitable for connection to a cartridge 20 containing a predetermined amount of additive.

In one embodiment, the additive inlet port 18 is fitted with an adapter 184 for connection to the cartridge 20.

In a preferred embodiment, the cartridge 20 comprises a tubular housing 22 for containing the additive to be injected into the air conditioning or refrigeration system.

In one embodiment, from a first end of the tubular housing 22a, a threaded nozzle 24 extends suitable for threaded connection with one end of the adapter 184.

A plunger 26 is slidingly inserted in a sealed manner in a second open end of the tubular housing 22 so as to force the additive contained in said tubular housing 22 to come out through the threaded nozzle 24.

The tubular housing 22 may be made of a transparent material and may comprise a plurality of notch markings suitable to permit the accurate injection of a desired amount of additive into the inner chamber 12 of the tubular element 10.

In one embodiment, the cartridge 20 further comprises a threaded cap, not shown, applied to the threaded nozzle 24 to prevent leakage of the additive from the nozzle when the cartridge 20 is not used.

In a preferred embodiment, the cartridge 12 is in the form of a disposable syringe, for example of the low-cost type available on the market, made of plastic material.

In a preferred embodiment, the cartridge is filled with the additive by the additive manufacturer.

For example, the cartridge 20 may have a volume of 30 ml, so as to allow several injections of additive, depending on use.

In one embodiment, the threaded nozzle 24 comprises an outlet tube 24' communicating with the inside of the tubular housing 22.

In one embodiment, the outlet tube 24' is surrounded by a "Luer-lock" coupling element 24 which comprises an inner thread of the type suitable for realizing a seal with an element connected thereto.

In one embodiment, the adapter 184 is in the form of a fitting and comprises a first end portion 184' suitable for connection to the threaded nozzle 24 of the cartridge 20 and a second end portion 184" connected to a threaded opening 186 made in the inlet fitting 14.

In a preferred embodiment, the first end portion 184' and the second end portion 184" are coaxial to each other and to the threaded nozzle 24.

In a preferred embodiment, the first end portion 184' has an outer thread so as to couple to the "Luer lock" coupling element 24 and to receive the outlet tube 24' of the nozzle 24 of the cartridge 20.

In one embodiment, the second end portion 184" of the adapter 184 forms a coupling with a one-way valve 182 housed in the additive inlet port 18.

In one embodiment, the service valve 300 of the refrigeration or air conditioning system is provided with a Schrader valve 302 housed in a "male" threaded fitting element 304, onto which a threaded "female" end portion 16', for example of the revolving type, of the outlet fitting 16 is screwed. This female threaded portion 16' is, for example, made according to the SAE standard and may, for example, be the size ¼ SAE (⁷⁄₁₆"-20 UNF (Standard Fine Thread)) or ⁵⁄₁₆ SAE (½"-20 UNF).

In one embodiment, the inlet fitting 14 is a "male" threaded fitting, onto which a "female" threaded fitting 202 attached to the end of the dispensing duct 200 is screwed.

In this case, the obturator member 144 of the inlet fitting 14 can be made with a Schrader valve which is pressed open when it is axially engaged by an obturator member 204 housed in the "female" type fitting 202 of the dispensing duct 200.

In one embodiment, the tubular element 10 is made of an elastomer material. The inlet 14 and outlet fittings 16 are attached by interference coupling to the tubular element 10.

More in detail, in one embodiment, the inlet 14 and outlet fittings 16 comprise respective proximal portions 146; 166 connecting to the respective end of the tubular element 10.

Each of such proximal portions 146; 166 comprises:
- an inner tubular portion 146'; 166' inserted coaxially into the respective end portion of the tubular element 10 and provided with a gripping toothing to the inner surface of said end portion of the tubular element;
- an outer tubular portion 146"; 166" coaxial to the inner tubular portion and defining therewith an annular interspace in which the end portion of the tubular element is inserted.

For example, the outer tubular portion 146 "; 166" is attached to the body of the fitting by crimping.

The present invention also relates to an injection kit of an additive into a refrigeration system, comprising an injection device 1 as described above and the aforementioned cartridge 20 containing a predetermined amount of additive to be injected, where the cartridge 20 is suitable to be fluidically connected to the additive inlet port 18.

The present invention also relates to an injection method of an additive into a refrigeration or air conditioning system using the aforementioned injection device. The injection method comprises the steps of:
- injecting the desired amount of additive into the tubular element 10 through the additive inlet port 18;
- connecting the inlet fitting 14 of the injection device 1 to a dispensing duct connected to a pressurised gas tank used in the refrigeration or air conditioning system, any air bubbles being previously discharged from said dispensing duct;
- connecting the outlet fitting 16 of the injection device 1 to the refrigeration system;
- making the tank of pressurised gas dispense a quantity of refrigerant gas.

In one embodiment, the amount of additive to be injected is contained in a cartridge 20 pre-loaded with a predetermined amount of additive.

In one embodiment, the cartridge 20 comprises a plunger 26 to force the additive out of the cartridge and the step of injecting the desired amount of additive into the tubular element 10 through the additive inlet port 18 comprises the steps of connecting the cartridge 20 to the additive inlet port 18 and actuating the plunger 26 so as to inject the desired amount of additive into the tubular element 10 of the injection device 1.

A person skilled in the art may make modifications and adaptations to injection methods and devices as described and claimed herein, replacing elements with others functionally equivalent so as to satisfy contingent requirements while remaining within the scope of the present invention. Each of the characteristics described in connection with particular embodiments may be realised independently of the other embodiments described.

The invention claimed is:

1. An injection device for injecting an additive into a refrigeration or air conditioning system, comprising:
   - a tubular element defining an inner chamber, said inner chamber having a volume at least equal to the volume of a quantity of additive to be injected;
   - an inlet fitting attached to a first end of said tubular element, said inlet fitting defining an inlet duct suitable for placing said inner chamber in fluidic communication with a dispensing duct of a pressurized gas used in the refrigeration or air conditioning system, said inlet duct being engaged by an inlet obturator movable between a closed position of the inlet duct when the inlet fitting is disconnected from the dispensing duct and an open position of the inlet duct when the inlet fitting is connected to said dispensing duct;
   - an outlet fitting fixed to a second end of said tubular element, said outlet fitting defining an outlet duct suitable for connecting to a refrigeration or air-conditioning system service valve;
   - an additive inlet port distinct from said inlet and outlet ducts, fluidically communicating with the inner chamber; and
   - an additive injection device removably coupled to the additive inlet port, said additive inlet port being engaged by a one-way port valve and allowing passage of the additive only from the injection device to the inner chamber under pressure received from the additive injection device, so as to cause the additive to mix with the pressurized gas contained in the inner chamber, wherein the additive inlet port is located in the inlet fitting, and wherein the inner chamber is dimensioned to have a same inner volume as the additive injection device.

2. The injection device of claim 1, wherein the tubular element is a tube of flexible material.

3. The injection device of claim 1, wherein the additive inlet port is located in an intermediate portion of the inlet fitting, between a proximal portion connected to the end of the tubular element and a distal portion connected to the dispensing duct.

4. The injection device of claim 1, wherein the additive injection device is a cartridge containing a predetermined amount of additive.

5. The injection device of claim 4, wherein the additive inlet port is fitted with a Luer-lock adapter for connection to a corresponding Luer-lock coupling element of the cartridge.

6. The injection device of claim 1, wherein the obturator of the inlet fitting is a Schrader valve.

7. The injection device of claim 1, wherein the tubular element is made of an elastomeric material, and wherein the inlet and output fittings are attached by interference couplings to the tubular element.

8. The injection device of claim 7, wherein the inlet and outlet fittings comprise a respective proximal portion for connection to the respective end of the tubular element, each of said proximal portions comprising:
   - an inner tubular portion inserted coaxially into the respective end portion of the tubular element and provided with a gripping toothing to the inner surface of said end portion of the tubular element; and
   - an outer tubular portion coaxial to the inner tubular portion and defining therewith an annular interspace in which the end portion of the tubular element is inserted.

9. The injection device of claim 1, in which the outlet fitting is a female swivel fitting of the SAE type.

10. An injection method for a refrigeration system, comprising the steps of:
    - providing an injection device according to claim 1;
    - injecting a desired amount of additive into the tubular element through the additive inlet port;
    - connecting the inlet fitting of the injection device to a dispensing duct of a reservoir of pressurized refrigerant gas;
    - connecting the outlet fitting of the injection device to the refrigeration system; and
    - causing the reservoir of refrigerant gas to dispense a quantity of refrigerant gas.

11. The injection method of claim 10, wherein the amount of additive to be injected is contained in the injection device which is configured as a syringe, and wherein the step of injecting the desired amount of additive into the tubular element through the additive inlet port comprises the step of connecting the syringe to the additive inlet port and actuating a plunger of the syringe so as to inject a predetermined amount of additive into the tubular element of the injection device.

* * * * *